Patented July 13, 1948

2,444,926

UNITED STATES PATENT OFFICE 2,444,926
SULFONAMIDE DERIVATIVES

Zoltán Földi, Árpád Gerecs, István Demjén, and Rezső König, Budapest, Hungary; vested in the Attorney General of the United States No Drawing. Original application June 24, 1940, Serial No. 342,190. Divided and this application April 10, 1941, Serial No. 387,980. In Hungary October 3, 1939

6 Claims. (Cl. 260—239.6)

The present invention relates to new 2-aminothiazole derivatives of anticoccic action, as well as new 2-amino-thiazole derivatives, which are suitable starting materials to prepare new 2-amino-thiazole derivatives of anticoccic action. These derivatives are, 2-arylsulphamido-4-oxythiazoles, in which the aryl-group contains in the para-position a member of the group consisting of: amino-, acylamino-, alkylamino-, acylated alkylamino-, nitro-groups, as substituent. The term aryl as is obvious from the following disclosure is intended to mean the phenyl radical.

Valuable starting materials are the acylamino-aryl-sulpho-thioureas, as well as the thioureides of heterocyclic aminosulphonic acids, such as the acylamino-pyridine-sulphonyl-thiourea.

Arylsulphonyl derivatives of the thiourea have been unknown until now, especially such arylsulphonyl-thioureas or thioureides of heterocyclic sulphonic acids, in which the aryl group or the heterocyclic nucleus contains amino or substituted or acylated amino groups, or other groups which are convertible into the groups enumerated before. The thiourea can not be acylated by acylating agents generally used for introduction of arylsulphonyl groups, because other reactions take place. Processes indeed must have been devised, thus, in order to obtain the starting materials for the present invention. These new starting materials can be obtained by splitting off the α-alkoxy-alkyl group from the S-(α-alkoxy-alkyl)-ethers of the iso-thiourea acylated by an aromatic or heterocyclic sulphonic acid group. The starting materials for the latter process were unknown until now. These starting materials can be obtained by subjecting iso-thiourea-ethers to the action of acylating agents suitable to introduce arylsulphonic groups or heterocyclic sulphonic acid groups. Such acylating agents are for example the arylsulpho halogenides, especially those, in which the aryl group is substituted by amino, alkylamino, acylamino groups or groups (such as nitro, azo, etc., groups) convertible into the groups mentioned before.

Such acylating agents are for example the acylamino-benzol-sulpho-halogenides, such as the p-acetylamino-benzolsulphonyl chloride. Pyridine-sulphonyl halogenides can also be used, for example the 2-acetamino-pyridine-5-sulphonyl bromide. One may use, preferably, as iso-thiourea-ethers the α-alkoxy-alkyl-ethers, such as the α-ethoxy-ethylether or, in the first place, the alkoxy-methyl-ethers, such as the methoxy-methyl or ethoxy-methyl ethers. These iso-thiourea-alkoxy-methyl ethers are preferably used in the form of their salts, as the free bases themselves are unstable. When using the salts, it is preferable to use acid binding agents, such as pyridine, sodium acetate, sodium alcoholate, and so forth.

Further details of the process for the obtaining of arylsulpho-iso-thiourea-ethers are to be found in the examples.

The removal of the alkoxy-alkyl group from the aryl-sulpho-iso-thiourea ethers can be, preferably, effected by alcoholysis. Especially for this splitting off those arylsulpho-iso-thiourea-alkyl ethers are suitable in which the alkyl group is an alkoxy-methyl or phenoxy-methyl group, preferably an ethoxy-methyl or methoxy-methyl group. The alcoholysis is effected, preferably, in the presence of acid catalysts, such as dry hydrochloric acid. The alcoholysis is effected in an absolute alcohol, containing 0.1–0.3 percent of dry hydrochloric acid. As alcohol, the methyl- or ethyl-alcohol can be advantageously used. The alkoxy-methyl groups are split off by this alcoholysis in form of acetales of formaldehyde. As starting materials for this hydrolysis acyl-amino-arylsulpho- or nitro-aryl-sulpho-iso-thiourea-alkoxy-methyl ethers can be preferably used.

Further details of the alcoholysis are to be found in the examples.

As other components for the process of the present invention are the α-halogenated acids or its ethers or α-halogenated derivatives of di- or poly-carboxylic acids or of their esters. Such compounds are for example the chloro-acetic acid, the chloroacetic acid ethylester, the bromo- or chloro-malonic acid diaethyl ester, the chloro-cyan-acetic-acid-ester, etc.

The reaction between the arylsulpho-thiourea and the α-halogenated oxo-compound is preferably carried out in the presence of an acid binding agent, such as pyridine or other tertiary heterocyclic bases.

Further details concerning the preparation of the starting materials and of the end-products are to be found in the examples.

(1) Thiourea and chloro-methylether are brought into interaction in acetone at room-temperature. The hydrochloride of the iso-thiourea-methoxy-methyl-ether separates. It melts at about 102°.

300 ccs. of absolute methylalcohol are cooled to —10° and 62.4 grams of chlorhydrate of iso-thiourea-methoxy-methylether are added. While stirring the hydro-chloride dissolves. Now a sodium-methylate solution is added in portions at −10°. The sodium-methylate solution has been prepared from 8.5 grams of sodium and 300 ccs. of absolute methylalcohol. After the sodium-methylate solution has been added, 42 grams of finely powdered p-acetamino-benzosulpho-chloride are added in portions at −10°, while stirring. The stirring is continued at −10°, then for about one hour at about 0°. The p-acetamino-benzol-sulpho-iso-thiourea-methoxy-methylether separates as a crystal mass. It is now filtered, the precipitate washed with water in order to eliminate the sodium chloride, then dried. One obtains about 40 grams of a white crystalline product, which melts at about 167°. It can be recrystallisated from alcohol.

One may prepare similarly the corresponding products, starting from benzolsulpho-chloride or from p-nitro-benzolsulpho-chloride or from 2-acetamino-pyridine-5-sulphonyl bromide.

(2) 37.6 grams of finely powdered p-acetylamino-benzol-sulpho-iso-thiourea-methoxy-methyl-ether are boiled for a minute in 222 ccs. of 99% methyl-alcohol and 1.1 ccs. of absolute ethylalcohol, containing 33% hydrochloric acid gas. The starting material passes into solution and crystallisation occurs soon. The mixture is boiled for further 2 minutes, then allowed to cool, then cooled by ice-water. The crystals are filtered. One obtains 25-28 grams of p-acetylamino-benzolsulpho-thiourea, as a white crystalline powder, which melts at about 200.5°. It dissolves in diluted alcohol and can be reprecipitated without alteration by acidification with acetic acid.

The splitting off of the methoxy-methyl group can be effected also in ethylalcoholic medium. Instead of the methoxy-methyl-ether of the p-acetamino-benzolsulpho-iso-thiourea, one may use the ethoxy-methyl-ether or the α-ethoxy-ethylether as well. Instead of the p-acetamino-benzolsulpho-iso-thiourea ethers one may use the corresponding p-nitro-benzolsulpho-iso-thiourea ethers. One obtains, in this case, the p-nitro-benzol-sulpho-thiourea. From 2-acet-amino-pyridine-5-sulpho-iso-thiourea-methoxy-methyl-ether one obtains the 2-acetamino-pyridine-5-sulpho-thiourea.

(3) 7.5 grams of ethyl chloro-acetate, 16.5 grams of p-acetamino-benzolsulpho-thiourea and 18 ccs. of pyridine are mixed. The temperature rises to about 40° and a dissolution occurs. After heating on the waterbath for about a quarter of an hour, the mixture is diluted by 150 ccs. of water, upon which the p-acetylamino-benzolsulpho-2-amino-4-oxy-thiazole separates as a crystalline powder. The yield is about 75% of the theory. It decomposes at 258–259°.

(4) 12.5 grams of ethyl chloro-acetate, 23 grams of p-amino-benzolsulpho-thiourea and 30 ccs. of pyridine are mixed. A slight elevation of the temperature takes place and the materials go into solution. The mixture is then heated on a water-bath for half an hour, then diluted by 150 ccs. of warm water. On cooling the p-amino-benzol-sulpho-2-amino-4-oxy-thiazole crystallises in compact crystals, melting at 235–37°. The yield is about 60% of the theory.

(5) 4 grams of chloro-malonic diethyl ester, 5.5 grams of p-acetamino-benzolsulpho-thiourea and 6 ccs. of pyridine are mixed, then heated at about 60° for a quarter of an hour. One obtains a homogeneous yellow syrup, which solidifies after standing for 2 hours. On addition of 70 ccs. of water, the crystals dissolve, followed soon by precipitation of white crystals. One obtains 7.05 grams of crystals, melting at 164° under development of gas. The product is recrystallisable from alcohol, the melting point rising thus to 165–166°. The product is the 4-oxy-derivative of p-acet-amino-benzol-sulpho-2-amino-5-carbethoxy-thiazole.

(6) 4.8 grams of bromo-malonic diethylester, 4.6 grams of p-amino-benzol-sulpho-thiourea and 6 ccs. of pyridine are mixed upon which the temperature rises to about 75°. The yellow thick syrup thus formed, is heated on the waterbath for 10 minutes, then allowed to stand for an hour and a half, and then diluted by 80 ccs. of water. The homogeneous solution deposits 5.9 grams of pale yellow crystals, which melt between 136–138°. This product recrystallised from alcohol melts at 138–139°, under decomposition. The product is the deacetylated derivative of the product described in the preceding example.

The experimental conditions given in the examples can be varied in many other respects as well.

As well known, 4-oxy-thiazoles show a tautomerism between the two following formulas:

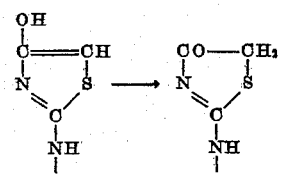

In the present invention a nomenclature according to the left-hand formula has been chosen.

This application is a division of the Földi, Gerecs, Demjén and König application 342,190 filed June 24, 1940, now Patent No. 2,332,906, dated October 26, 1943.

What we claim is:

1. New compounds of the class consisting of 2-phenylsulfamido-4-oxy-thiazoles and 2-phenyl-sulfamido-4-oxo-thiazoles, in which the phenyl group contains in the para-position a member of the group consisting of: amino-, acylamino-, alkylamino-, nitro-groups, as substituent.

2. As a new product the p-acetylamino-benzolsulpho-2-amino-4-oxy-thiazole.

3. As a new product the p-amino-benzolsulpho-2-amino-4-oxy-thiazole.

4. A compound having a formula of the class consisting of:

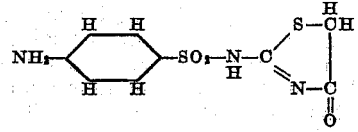

and

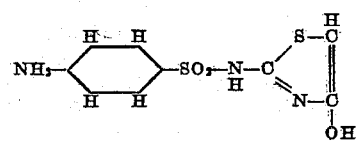

5. A compound having a formula of the class consisting of:

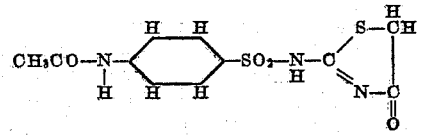

and
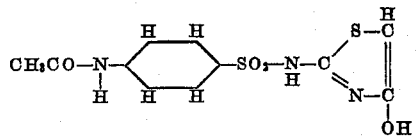
6. Compounds containing a radical of the class consisting of
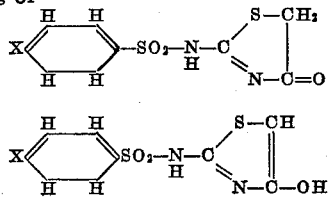
and
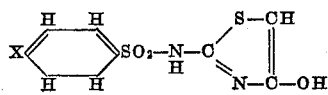
in which X is a member of the class consisting of amino, acylamino, alkylamino, and nitro groups.
ZOLTÁN FÖLDI.
ÁRPÁD GERECS.
ISTVÁN DEMJÉN.
REZSŐ KÖNIG.
REFERENCES CITED
The following references are of record in the file of this patent:
FOREIGN PATENTS
| Number | Country | Date |
| --- | --- | --- |
| 517,272 | Great Britain | Jan. 25, 1940 |